April 7, 1936.  R. BECHMANN  2,036,562
ULTRA SHORT WAVE OSCILLATION GENERATOR
Filed Aug. 26, 1933
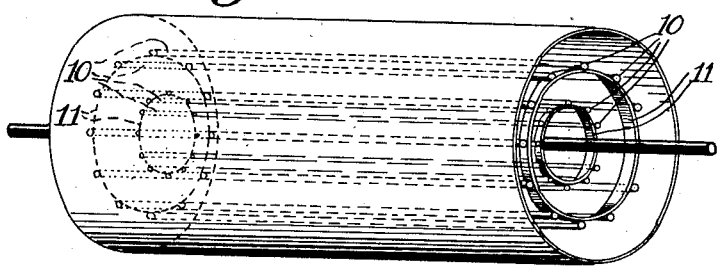
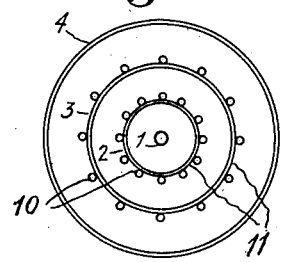
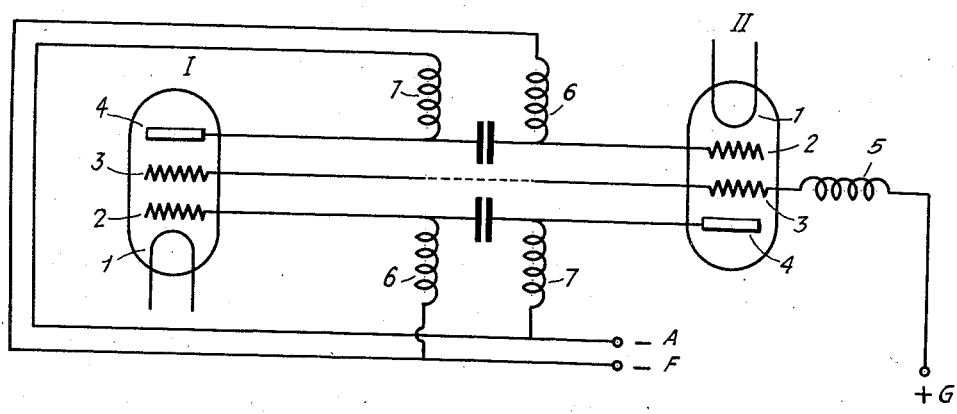
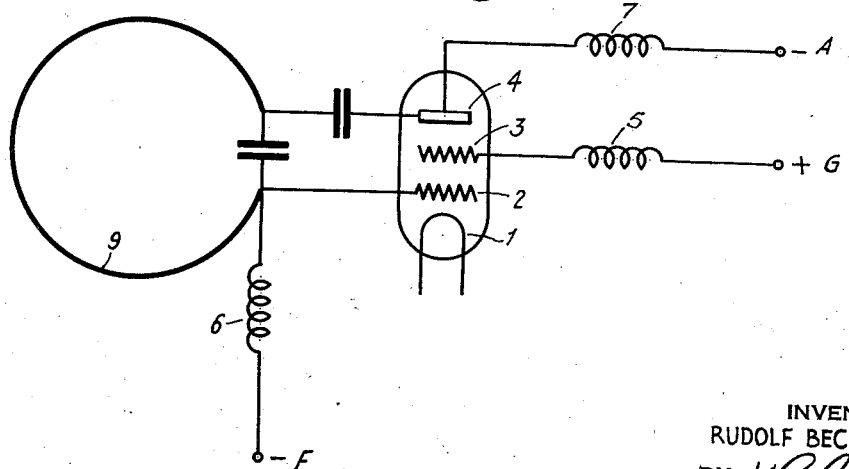
INVENTOR
RUDOLF BECHMANN
BY
ATTORNEY Patented Apr. 7, 1936

2,036,562

UNITED STATES PATENT OFFICE 2,036,562

ULTRA-SHORT WAVE OSCILLATION GENERATOR

Rudolf Bechmann, Berlin, Germany, assignor to Telefunken Gesellschaft für Drahtlose Telegraphie m. b. H., Berlin, Germany, a corporation of Germany Application August 26, 1933, Serial No. 686,975
In Germany September 20, 1932

6 Claims. (Cl. 250—36)

In the generation of waves by what is known as the Barkhausen-Kurz circuit principle comprising a grid operated at a high positive potential and a plate run at a feebly negative potential, the efficiency is rather low. This, among other things, is due to the fact that a great many of the electrons emitted from the cathode are directly taken up or absorbed by the strongly positive grid with the result that these particular electrons will not participate in the oscillation process which essentially consists of a pendulous motion of the electrons around the grid. In order to diminish this ineffective grid current the suggestion has been made to surround the control grid about which the electron oscillations are concentrated with a static shielding grid which is designed to so shape the field distribution inside the tube that that portion of the grid current which fails to take part in the oscillation process will be reduced.

Now, according to the present invention a considerably greater shielding effect is obtainable and at the same time a considerably stronger activation of the oscillations and thus also a higher efficiency are insured by the use of a twin-grid tube in what is known as a retarder-field circuit arrangement (Fig. 1), if a "collector" grid interposed between grid and cathode is controlled by the frequency to be excited, that is to say, if the same is included in the oscillations mechanism and means. This collector grid is so controlled, according to the invention, that the alternating voltage of the same is shifted an angle of 180 degrees in relation to the plate voltage. Several circuit schemes comprising both one and two tubes in a push-pull arrangement allow of the above novel control action.

Figure 1 shows in section, and Figure 1a in perspective, the essential feature of the present invention wherein there is utilized the "collector" grid. Figure 2 illustrates a circuit arrangement based upon phase opposition, and Figure 3 shows schematically a single-tube circuit scheme.

Figures 1 and 1a show one way in which the grids of the tube may be mounted. These grids are shown as a group of parallel wires 10, arranged around two concentric circles, the wires being held together at both ends of the tube by circular metallic bands 11.

Referring to Figure 2 the collector grids 2 are here united, respectively, with the plates 4 of the other tubes. In order that the proper phase conditions may be realized, the connections should preferably be designed to act as Lecher wires, the effective lengths between the electrodes being approximately equal to one-half of the wave length ($\lambda$) to be produced. The connection of the grids 3, for phase reasons, may be extended to the full value of $\lambda$. The collector grids 2 are fed by way of the choke coils 6, 6 and the plates are supplied by way of the chokes 7, 7 and the grids 3 finally by way of the chokes 5, 5. Most suitably, the collector grid 2 has a negative biasing voltage—F in order that the control action may be effected in the absence of energy consumption. The Lecher wires could be replaced also by circuits of suitable wave length.

In Figure 3, plate 4 and collector grid 2 are inter-connected by way of a circuit 9 which is tuned to the generated wave length. In this way the requisite condition of phase opposition is necessarily produced between the two electrodes 2 and 4. Also, here the grid 2 has a negative bias. 5, 6 and 7 are choke coils by way of which the electrodes are fed.

I claim:

1. An ultra-short wave oscillation generator comprising an electron discharge device having within a single container a cathode for emitting electrons, a grid, a plate, and a collector grid interposed between said cathode and said first grid, means for maintaining said first grid at a relatively high positive potential and said collector grid and plate at a negative potential with respect to said cathode.

2. An ultra-short wave oscillation generator circuit comprising two electron discharge devices each having a cathode for emitting electrons, a grid, a plate, and an auxiliary electrode interposed between the cathode and grid, means for supplying the grid of each device with a relatively high positive potential and the plate of each device with a much lower potential with respect to the cathode of the same device, said means also supplying the auxiliary electrode of each device with a potential which is negative with respect to its associated cathode, individual connections coupling the plate of each device with the auxiliary electrode of the other device, and a condenser in each of said connections for preventing the flow of direct current between the plate of each device and the auxiliary electrode of the other device.

3. An ultra-short wave oscillation generator circuit comprising two electron discharge devices each having a cathode for emitting electrons, a grid, a plate, and an auxiliary electrode interposed between the cathode and grid, means for supplying the grid of each device with a relatively high positive potential and the plate of each device with a much lower potential with respect to the cathode of the same device, said means also supplying the auxiliary electrode of each device with a potential which is negative with respect to its associated cathode, individual connections each a half wave length long at the operating frequency coupling the plate of each device with the auxiliary electrode of the other device, and a condenser in each of said connections for preventing the flow of direct current between the plate of each device and the auxiliary electrode of the other device.

4. An ultra-short wave oscillation generator circuit comprising two electron discharge devices each having a cathode for emitting electrons, a grid, a plate, and an auxiliary electrode interposed between the cathode and grid, means for supplying the grid of each device with a relatively high positive potential and the plate of each device with a much lower potential with respect to the cathode of the same device, said means also supplying the auxiliary electrode of each device with a potential which is negative with respect to its associated cathode, individual connections coupling the plate of each device with the auxiliary electrode of the other device, a condenser in each of said connections for preventing the flow of direct current between the plate of each device and the auxiliary electrode of the other device, and a connection substantially one wave length long at the operating frequency coupling together the grids of the two devices.

5. An ultra-short wave oscillation generator circuit comprising two electron discharge devices each having a cathode for emitting electrons, a grid, a plate, and an auxiliary electrode interposed between the cathode and grid, means for supplying the grid of each device with a relatively high positive potential and the plate of each device with a much lower potential with respect to the cathode of the same device, said means also supplying the auxiliary electrode of each device with a potential which is negative with respect to its associated cathode, individual connections each a half wave length long at the operating frequency coupling the plate of each device with the auxiliary electrode of the other device, a condenser in each of said connections for preventing the flow of direct current between the plate of each device and the auxiliary electrode of the other device, and a connection substantially one wave length long at the operating frequency coupling together the grids of the two devices.

6. An ultra-short wave oscillation generator comprising an electron discharge device having within a single container a cathode for emitting electrons, a first grid, a plate, and a collector grid interposed between said cathode and said first grid, means for maintaining said first grid at a relatively high positive potential and said plate at a much lower potential with respect to said cathode, and means for supplying said collector grid with an alternating potential which presents a phase displacement angle of 180° with respect to the plate alternating potential.

RUDOLF BECHMANN.